United States Patent [19]
Coughenour et al.

[11] 4,085,691
[45] Apr. 25, 1978

[54] SEWING MACHINE WITH PROGRAMMABLE MEMORY

[75] Inventors: Donald Jay Coughenour, Morristown; Jack Brown, Union, both of N.J.

[73] Assignee: The Singer Company, New York, N.Y.

[21] Appl. No.: 709,049

[22] Filed: Jul. 27, 1976

[51] Int. Cl.$^2$ ............................................. D05B 3/02
[52] U.S. Cl. ................................. 112/158 E; 318/568
[58] Field of Search .......... 112/158 E, 121.11, 121.12; 318/568; 235/145 R

[56] References Cited

U.S. PATENT DOCUMENTS

| | | | |
|---|---|---|---|
| 3,413,648 | 11/1968 | Martsolf | 235/145 R X |
| 3,654,882 | 4/1972 | Kamena | 112/121.11 |
| 3,783,253 | 1/1974 | Anderson et al. | 318/568 X |
| 3,872,808 | 3/1975 | Wurst | 112/158 E |
| 3,970,016 | 7/1976 | Yanikoski | 112/121.12 |

OTHER PUBLICATIONS

Uimari, "PROMs–a Practical Alternative to Random Logic," Electronic Products, Jan. 21, 1974, vol. 16, No. 8, pp. 75, 76, 77, 82, 87, 91.

*Primary Examiner*—Werner H. Schroeder
*Assistant Examiner*—Peter Nerbun
*Attorney, Agent, or Firm*—Edward P. Schmidt; Edward L. Bell; Robert E. Smith

[57] ABSTRACT

This disclosure relates to electronically controlled sewing machines and in particular to the combination of such a machine with a re-programmable static memory with which an operator can program in input data representative of a stitch position coordinates for selected patterns, which input data will be encoded into digital form, stored and decoded into input signals for initiating operation of the sewing machine stitch position actuating means to produce patterns corresponding to the operator selected pattern. The re-programmable memory can be located remote from the machine or can be built in as an integral part of the structure of the machine itself. The machine may also contain a static read-only-memory (ROM) having fixed patterns for operation of the machine with or without a re-programmable memory and includes switching means for disconnecting the read-only-memory when the re-programmable memory is connected to the machine.

9 Claims, 5 Drawing Figures

U.S. Patent  April 25, 1978  Sheet 2 of 4  4,085,691
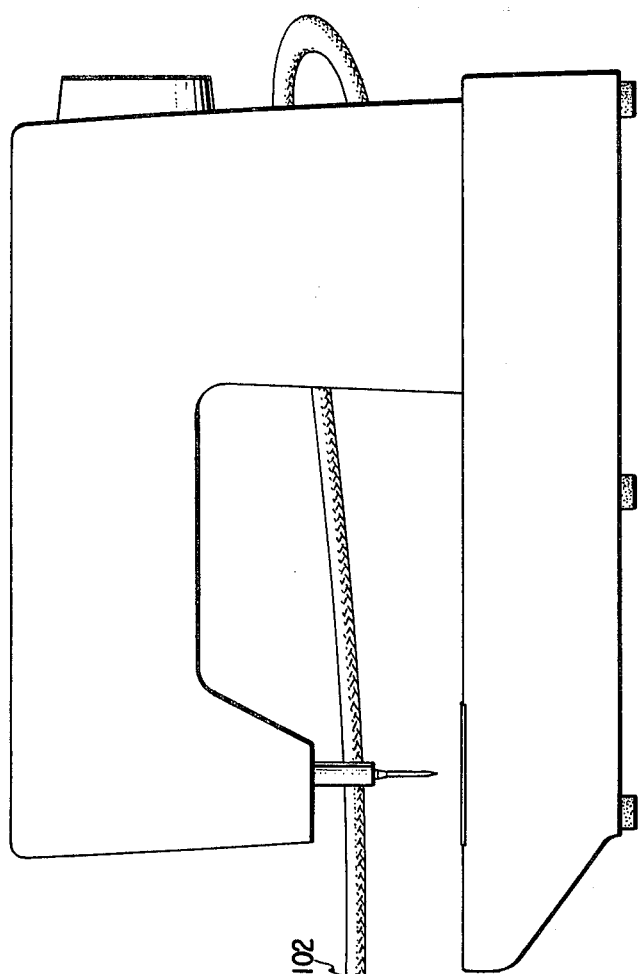
Fig. 2
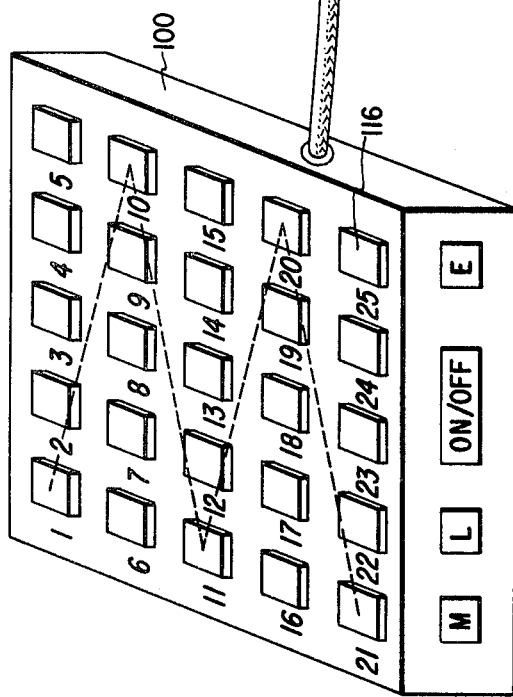
Fig. 4
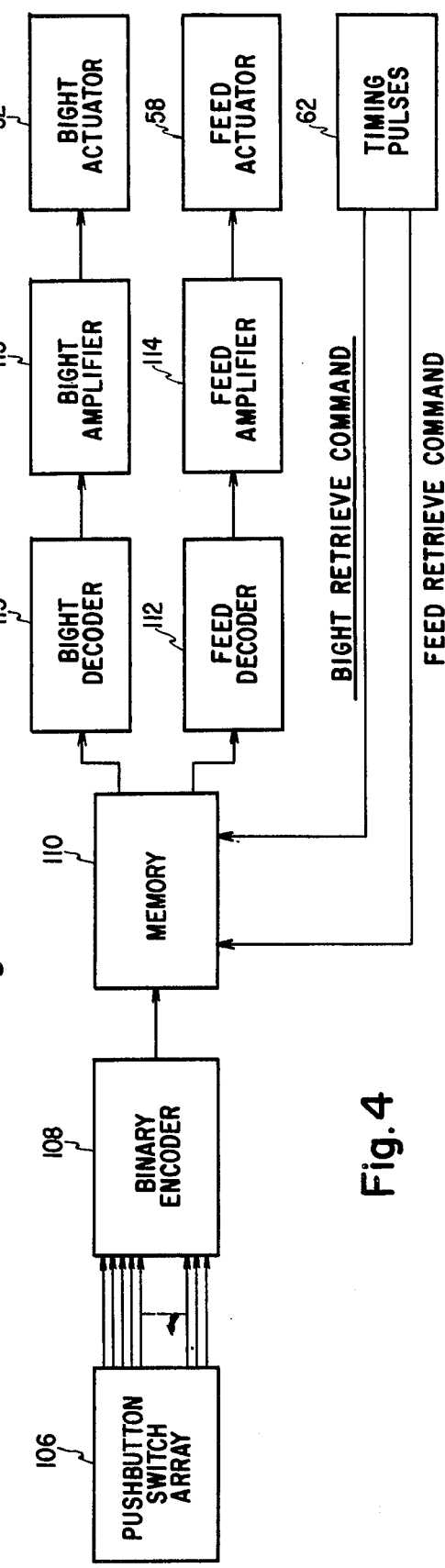

SEWING MACHINE WITH PROGRAMMABLE MEMORY

BACKGROUND OF THE INVENTION

In recent times an electronically controlled sewing machine has been introduced into the marketplace and is generally of the type illustrated in U.S. Pat. No. 3,872,808, issued Mar. 25, 1975. In such a machine a static read-only-memory device is provided in which is stored stitch pattern coordinates for the needle positions and fabric feed positions for a selected number of stitch patterns. Upon selection of a pattern from a pattern display on a machine, the read-only-memory is addressed and information is released in accordance with timing pulses coordinated with the mechanism of the machine which signals are converted from digital to analogue form and fed to an actuating mechanism for the needle position and the fabric feed position to reproduce the selected pattern. With such machines the number of patterns that can be selected is restricted in accordance with the capacity of the read-only-memory device and once the patterns are fed into such a memory they are locked therein. In other words, the machine does not possess the capability of reprogramming or selective programming by operator generated information.

Dynamic programming devices such as tape drives of the magnetic and punched varieties, for example, are not practical for use in sewing machines since they require relatively elaborate power supplies for their operation. Also, tape-type memories must be recorded and read sequentially, and therefore, the operator cannot select patterns at random or from different sections of the memory at will. One such device applied to a sewing machine is illustrated in Japanese Patent Publication No. 15713/70 published on June 1, 1970. However, the machine disclosed in the Japanese patent only purports to provide needle control for production of geometric patterns and is not capable of producing non-geometric patterns which require both signals for the needle and the fabric feed. Further, a machine of this type has never been successfully introduced into the market place.

One solution to the problem of providing a re-programmable memory for a sewing machine has been proposed and disclosed in U.S. Patent application Ser. No. 631,776, filed Nov. 13, 1975 by Herr et al and assigned to the same assignee as the present application. In this referenced application, a magnetizable material is utilized for the memory which can be selectively magnetized by the operator in accordance with pattern instructions. The magnetizable memory is then read by the machine to reproduce the pattern either by mechanical means or electronic means.

GENERAL DESCRIPTION OF INVENTION

The present application provides for a static type of reprogrammable memory and sewing machine combination through which digital information may be put directly into the memory by the operator and does not require an intermediate reading device to read the program from the memory and then convert the information read therefrom into digital information. In one embodiment of the present invention the re-programmable device is located remote from the sewing machine and is readily removable therefrom and the machine is capable of being operated by information from the re-programmable memory device when connected thereto or separately from a read-only-memory incorporated within the machine when the remote re-programmable memory is disconnected therefrom. A further embodiment of the invention provides for the location of the re-programmable memory device to be integral with the machine so that the operator can input a selected pattern directly into the sewing machine display panel on the front thereof. The invention also contemplates the use of a re-programmable device on which the pattern can be visually perceived by the operator while providing the necessary digital input to the re-programmable memory for storing the pattern therein. When used herein, the term programmable memory preferably refers to a storage device of the static random access memory type (RAM) capable of being re-programmed upon introduction of programming instructions and includes a random access memory which may be programmed with all desired stitch coordinates capable of being reproduced by a sewing machine and when addressed with proper code information releasing the stitch coordinate information in accordance with the addressed code information.

Accordingly, it is an object of the invention to provide a novel electronically controlled sewing machine having a programmable device which can be programmed by the operator to provide stitch patterns of the operator's own choosing, if desired. It is also an object of the invention to provide a remote programmable memory device for use with the sewing machine for inputing digital signals to the machine for controlling the stitch pattern instrumentalities of the machines. It is also an object of the invention to provide a programmable memory device through which the operator can visually perceive the desired pattern thereon and input into the memory device the appropriate digital data corresponding to the visually perceived pattern for providing control signals to the sewing instrumentalities of the sewing machine. Other objects and advantages of the invention will be best understood upon reading the following detailed description with the accompanying drawings.

DESCRIPTION OF THE DRAWINGS

In the accompanying drawings of preferred embodiments of the invention:

FIG. 2 is a view of a sewing machine and remote static programmable memory with the machine shown in front plan view and the memory shown in perspective view;

FIG. 4 is a schematic block diagram showing the components of the programmable memory device illustrated in FIG. 2 and their connection to a sewing machine actuator or control mechanism.

DESCRIPTION OF A PREFERRED EMBODIMENT

Figure 1:
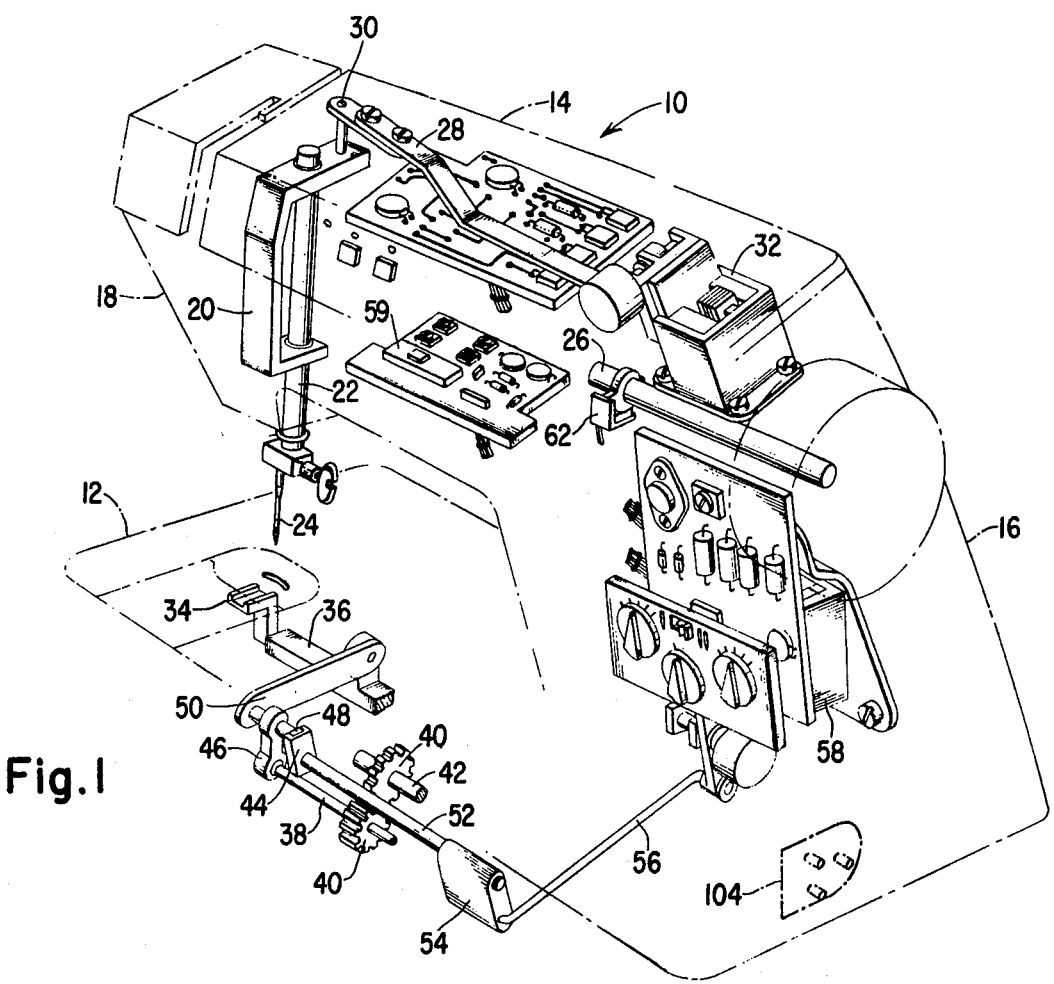
FIG. 1 is a perspective view of a sewing machine of the type used in the combination of the present invention with the frame thereof showing in phantom and components thereof shown in elevation.

Referring to the drawings, in FIG. 1 there is shown a sewing machine casing 10 illustrated in phantom lines which sewing machine includes a bed 12, a bracket arm 14 and a standard 16 interconnecting the bracket arm 14 with the bed 12 as illustrated. The bracket arm 14 terminates in a head portion 18 within which is supported in a conventional manner a needle bar gate 20 in which is supported for end wise reciprocation a needle bar 22 carrying at its lower end a needle 24. Endwise reciprocation is imparted to the needle bar 22 by an arm shaft 26 which is rotated by an electric motor (not shown) and connected to the needle bar by a conventional sewing machine mechanism (not shown) such as an eccentric mechanism to convert the rotary motion of the arm shaft 26 to reciprocating motion of the needle bar 22.

An actuating arm 28 is connected to the needle bar gate 20 at a pivotal connection 30 to convert reciprocating motion of the actuating arm 28 imparted by a linear motor or actuator 32 into pivotal motion of the needle bar gate 20. The linear motor 32 is of the reversible type and may be of the same type as fully described in U.S. Application Ser. No. 431,649, filed on Jan. 8, 1974, and assigned to the same assignee as the present invention. It will be seen therefore that the linear motor 32 may be used to determine the lateral position of the needle 24 as it penetrates the fabric disposed on the bed 12 to place a thread therethrough at a particular stitch position coordinate.

In order to feed the fabric across the bed 12 in the usual manner, a feed dog 34 is disposed beneath the bed and is supported by a feed bar 36. Work transporting motion is imparted to the feed dog by means of a feed drive shaft 38 driven by gears 40 which in turn are driven by a bed shaft 42 connected to the machine arm shaft 26 in timed relationship by a conventional mechanism (not shown). A cam 44 is connected to a pitman 46 through a slide block 48 which is disposed in a slot in the cam 44. The pitman 46 is also connected to a horizontal link 50 which in turn is pivotally connected to the feed bar 36 as shown. Thus for a given inclination of the cam 44, a predictable horizontal motion of the slide block will result which is transferred to the feed dog 34 by the horizontal link member 50 and the feed bar 36. The inclination of the cam 44 may be adjusted by rotation of regulator shaft 52 which is fixed to the cam 44. The regulator shaft 52 has a rock arm 54 fixed thereto at one end with the rock arm 54 having a rod 56 also connected thereto which in turn is connected to a second reversible linear motor 58. Therefore, the linear motor 58 will be utilized to determine the feed rate of the sewing machine by determining the inclination of the cam 44.

Figure 3:
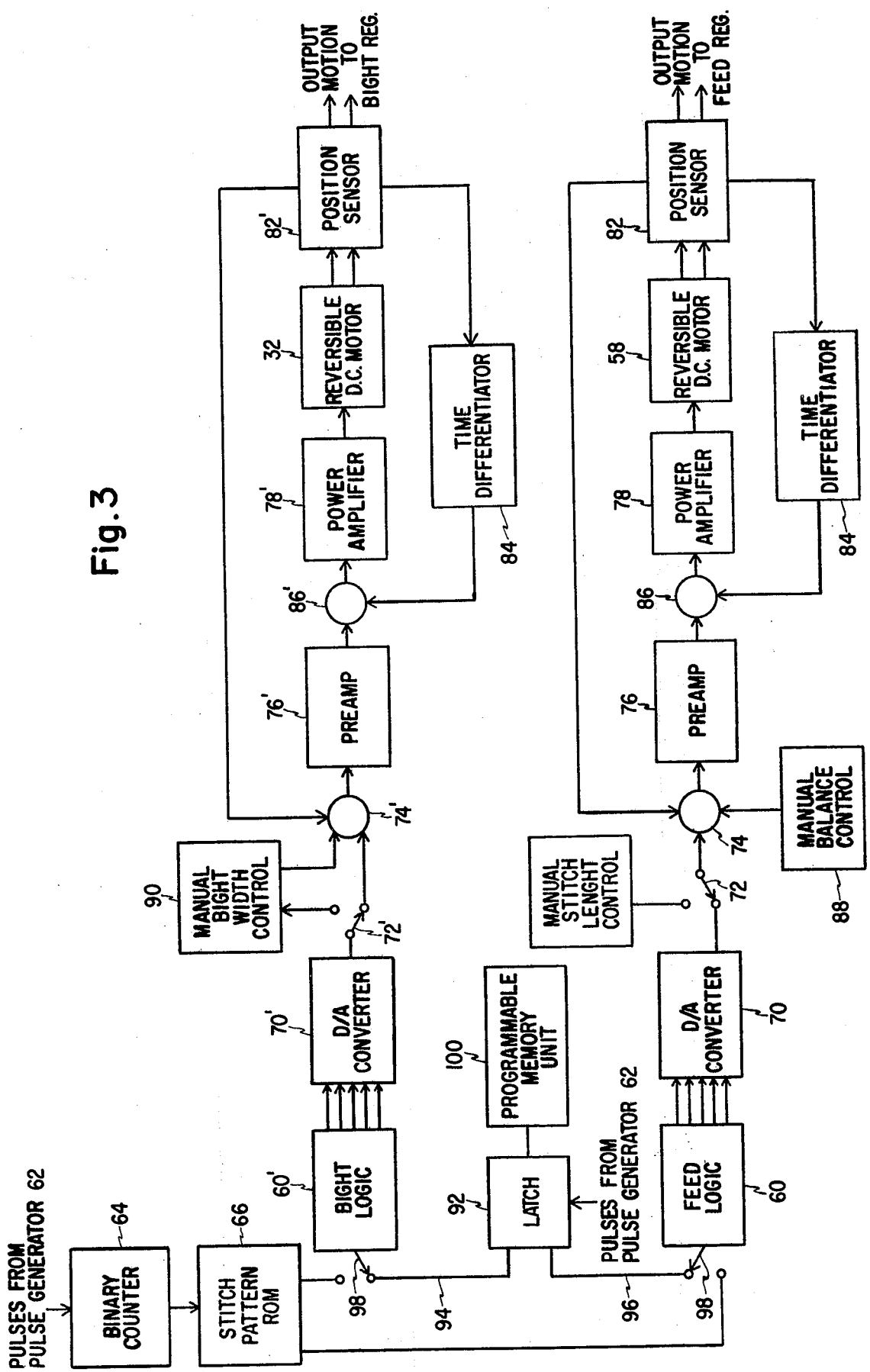
FIG. 3 is a general schematic block diagram of a system for adapting a static programmable memory unit to an existing machine having electronic stitch pattern controls.

Referring now to FIG. 3, the general schematic block diagram is shown therein for the bight and feed control of the sewing machine. The portions of the block diagram for bight and feed control are substantially similar and it will suffice to describe the feed control only with similar numerals used for similar elements in the bight circuit except with the prime thereafter. The pattern information used for generating signals to drive the linear motors 32 and 58 preferably originates in a MOS-FET Large Scale Integration (LSI) integrated circuit which is physically shown in FIG. 1 at 59 as a so-called Chip and may include an ROM, the bight logic and the feed logic portion of the electronic circuitry. A pulse generator 62 is supported on the main shaft 26 and is operative to generate pulses which are counted up in the binary counter 64 and presented as address inputs to the stitch pattern ROM 66 which is encoded to produce as output therefrom five bits of bight information and five bits of feed information as indicated as the output from the feed logic 60 and the bight logic 60'. The feed information is processed in the logic block 60 and may include a latch whereby the feed information may be held for later release to the feed servo system at a time appropriate to the operation of the feed mechanism. Similarly, the bight information is processed in logic block 60' and may include a latch whereby the bight information may be held for a later release to the bight servo system at a time appropriate to the operation of the needle jogging mechanism. As mentioned above, since the servo systems for the bight and for the feed are identical except for the specific switching necessary for manual over-ride and balance control in the feed regulating system, the following description will for convenience be confined to the feed system only.

The information processed by the feed logic block 60 is presented to the digital-to-analog converter 70, which may be a commercially obtainable unit such as the type known as the MOTOROLA MC 1406 Unit. The converter 70 has an output which is a DC analog voltage representing a required feed position input. This line connects, in the automatic mode position of a switch 72, to a summing point 74 of a low level preamplifier 76 forming the first stage of a servo amplifier system. The switch 72 may comprise an FET switch. The preamplifier 76 drives a power amplifier 78 which supplies direct current of reversible polarity to the electromechanical actuator or linear motor 58, which in its broadest sense comprises a reversible motor, to position the actuator 58 in accordance with the input analog voltage from the converter 70. A feedback position sensor 82 mechanically connected to the actuator 58 provides a feedback position signal indicative of the existing output position. The input analog voltage and a feedback signal are algebraically summed at the summing point 86 to supply an error signal. The feedback signal from the position sensor 82 is also differentiated with respect to time in a differentiator 84 and the resulting rate signal is presented to the summing point 86 of the power amplifier 78 to modify the positional signal at that point. The position sensor 82 may be any device that generates an analog voltage proportional to position and may, in this embodiment, be a simple linear potentiometer connected to a stable reference voltage and functioning as a voltage divider. The differentiator 84 is preferable an operational amplifier connected to produce an output signal equal to the time rate of change of the input voltage, as is well known in this art.

While the actuators 32 and 58 may be a conventional low-inertia rotary D.C. motor, it is preferable for the purpose of the present invention that they take the form of a linear actuator in which a light-weight coil moves linearly in a constant flux field and is directly coupled to the load to be positioned. This simplifies the driving mechanical linkage and minimizes the load inertia of the system. A switch 72 shown in the automatic mode position in FIG. 3 may be operated from the automatic position to another position referred to as the manual position. In this position the analog position voltage from the converter 70 is disconnected from the summing point 74 and the voltage from a potentiometer 88 is substituted therefore. Reference may be made to copending U.S. Patent Application Ser. No. 596,683, July 16, 1975 and assigned to the same assignee as the present application for a more complete description of the manual stitch length control system.

Referring now to the bight control system illustrated in FIG. 3, a switch 72' shown in the automatic mode position may be operated also in a manual position for connecting into the circuit a manual bight width control circuit 90. Switches 72' and 72 may comprise F.E.T. switches. In changing the switch 72' to the manual position a potentiometer, indicated as the manual bight width control 90, is inserted into the circuit and acts as a scaling rheostat for the analog bight voltage from the converter 70' to provide any desired fraction of this voltage at the summing point 74' and so provides convenient means for narrowing or altering the pattern.

As further shown in FIG. 3, signals may be directed from a latch 92, which is set by each pulse received from the pulse generator 62, to provide an output on line 94 to the bight logic 60' and an output on line 96 to the feed logic 60. F.E.T. switches 98 may be used selectively to connect the bight logic 60' and the feed logic 60 to the output of a static programmable memory unit 100 or to the stitch pattern read-only-memory 66 of the sewing machine. Preferably the switch 98 is a ganged switch comprising the individual switches 98 shown connected to the bight logic 60' and the feed logic 60 so that the switches will be simultaneously shifted fom association with the ROM 66 to association with the programmable memory unit 100. The purpose of switching from the ROM 66 to the programmable unit 100 will be more clearly described hereinafter.

The programmable memory unit 100 is therefore compatible with the use of a stitch pattern read-only-memory unit 66 in a sewing machine in which the stitch position coordinate pattern data is electrically extrated and manipulated. The combination and selective use of the two types of memory devices disclosed herein provides a convenient means whereby operator generated stitch patterns may be implemented while retaining in the machine the ability to select from a permanently stored memory those patterns which may be most frequently utilized.

As mentioned above, it is the purpose of the invention to provide a novel combination of a programmable memory with an electronic sewing machine in which the operator can select patterns for storage in a memory device which can be reproduced by sewing machine. For accomplishing this purpose a programmable memory 100 is provided for coupling to the sewing machine as through an electrical wire 102 having a plug or the like (not shown) for connection to a socket 104 on the sewing machine. The socket 104 may include provision for actuating the switch 98 to disengage the ROM 66 and actively couple the programmable memory unit 100 to the machine. Also, electrical current may be supplied to the memory unit 100 from the machine which is connected to an alternating current source in a known manner. The programmable memory unit 100 is of the digital type and includes appropriate selector buttons on the face plate thereof illustrated as push buttons, numbered 1 through 25 in FIG. 2, for insertion of a digital code, preferably in binary form, into the memory unit 100. As schematically shown in block diagram form in FIG. 4, the memory unit 100 preferably includes a selector 106, identified as "Push Button Switch Array", connected to a binary encoder 108 connected in turn to the memory 110, which is a random access-type memory, as described above. As further illustrated in FIG. 4, when the memory unit 100 is connected to the sewing machine it will be coupled to the bight and feed logic, illustrated at 112 and 113, as decoders, which comprises both the bight and feed logic, and then to the amplifiers 114 and 115 including the preamps and power amplifiers 76, 76' and 78, 78' shown in FIG. 3, and finally to the reversible DC motors 32, 58. As in the description of FIG. 3 above, a pulse generator 62 is used to address the memory 110 to withdraw therefrom the appropriate stored signals.

The programmable memory unit 100 shown in FIG. 2 also includes a switch "M" for initiating a program, previously referred to digital code selector push buttons 116, numbered 1-25, and a load selector switch "L" which is used to load into the memory itself the digital code for the bight or feed selected, as will be described hereinafter. Also on the panel is an on-off switch for independently turning the programmable memory unit on or off and a button indicated as "E" for, erasing a program or pattern before insertion of a new one.

The push buttons, numbered 1-25, each are operable for generating a discrete voltage signal having a value distinctly assigned to it. This voltage signal from each push button may be encoded into a discrete and distinct binary code corresponding to the respective voltage signal generated by the associated push button. Thus, each push button can generate a voltage signal having a value assigned to it for conversion into stitch coordinates represented in binary code signals. When an operator presses a button 116, a voltage signal will be generated which will be encoded by the binary encoder 108 into a binary number for the bight and feed, which represents a stitch position coordinate for a sewing pattern, and will then be stored in memory 110. For example, for the pattern shown in FIG. 2 on memory unit 100 which is a zig-zag pattern, when the operator presses push button numbered 1, a digital code in binary form may be generated having bight coordinate 0000 and feed coordinate 0000. When push button number 10 is pressed, the code may be 0110 for the bight and 0001 for the feed. Obviously, these code numbers may be different than that represented herein but, they will serve to illustrate that such types of values can be assigned to each push button 116. The operator can visualize the pattern on the array of push buttons 116, such as the zig-zag pattern represented in FIG. 2, and push the appropriate buttons or could refer to a visual reproduction of various patterns with assigned button numbers corresponding to the stitch coordinates for the selected pattern. It will also be understood that more or less push buttons 116 may be provided with more of such buttons producing finer pattern definition which may be desirable in the case of some more intricate patterns than the one illustrated in FIG. 2.

Figure 5:
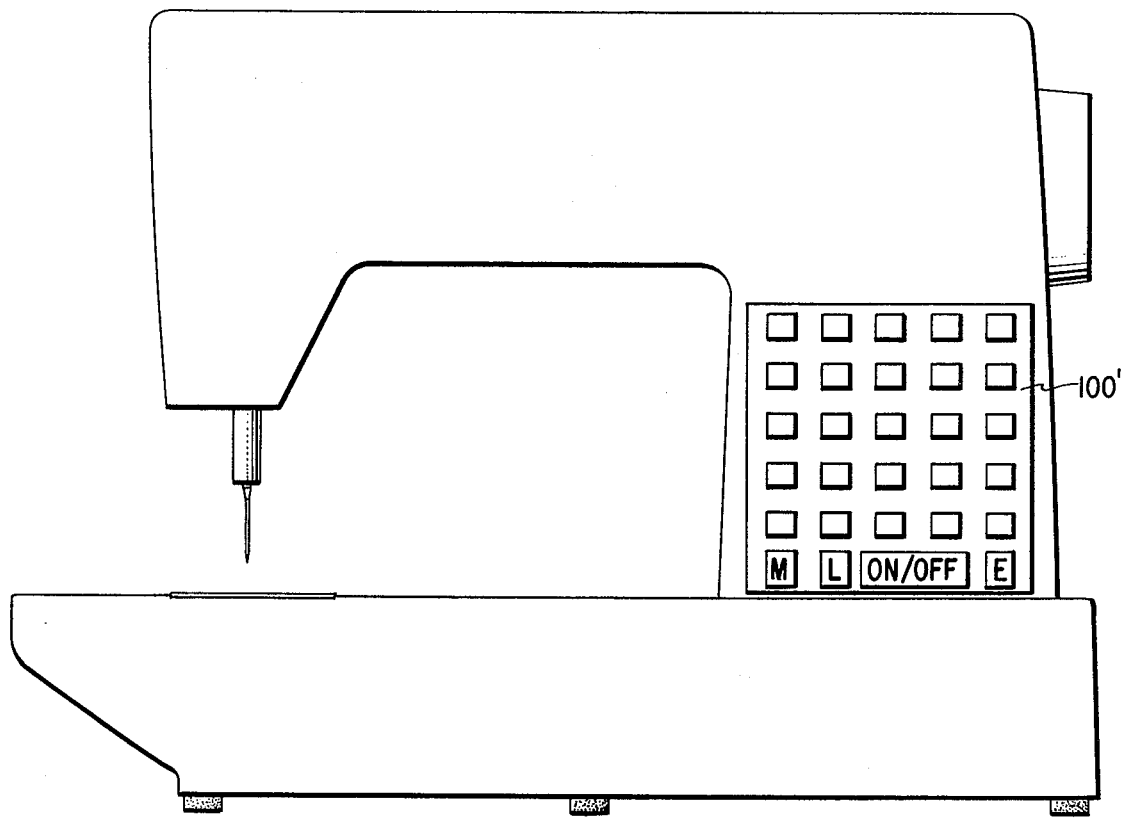
FIG. 5 is a front plan view of a sewing machine illustrating another embodiment with a static re-programmable memory.

The operation of the remote programmable memory unit 100 for selecting a pattern will be best understood in referring to both FIGS. 2 and 5. As shown in FIG. 2 a pattern is illustrated therein which may be provided in a pattern book or pattern cards for the operator as described above and which may be reduced to its appropriate push button code for use by the operator. For example, if the operator should wish to program in the zig-zag pattern which is illustrated in FIG. 2, the operator could turn to the page of a pattern code book in which this pattern may be located, make sure the memory unit 100 is turned on and push the memory button to initiate the start of a program. For the pattern illustrated, the operator would then push buttons 1, 10, 11, 20 and 21 which would be the numerical representation of the pattern corresponding to the numbers of the push buttons. After the selection of the coordinates represented by these push buttons the operator would push the load button "L", whereupon the coordinates would be loaded into the memory. In order to then reproduce the patterns in the sewing machine the operator would activate the appropriate control on the sewing machine such as a foot controller or the like and the appropriate stitch pattern signals would be sequentially fed from the memory unit into the logic circuit of the sewing machine which would reproduce the pattern in accordance with the description of the electronic sewing machine of above.

Referring now to FIG. 5, the programmable memory unit is illustrated therein as being integral with the frame of the sewing machine. In other words, instead of having a remote programmable memory of the type shown in FIG. 2, it is also within the scope of the invention to provide a similar programmable memory unit 100' but built into the frame of the machine so that the operator may program patterns into the machine directly on the face plate thereof. In this embodiment the on-off switch may be used for activating or deactivating the switch 98 to substitute the programmable memory unit 100' for the ROM 66. It should be understood, however, that it is within the scope of the invention to provide only programmable memory without an ROM so that each pattern selected by the operator must be programmed in by the operator.

In operation, once a particular pattern is programmed into the memory units 100 and 100' and the sewing machine is activated the pattern will be continually reproduced as long as that program is in the memory unit. In order to select another pattern the operator need merely push the erase button "E" on the program memory unit 100 or 100' and insert a new pattern which will then be recorded in the memory in place of the previously selected pattern. Alternatively of course, the programmable memory unit may be disconnected or switched off whereupon patterns provided in the ROM may be utilized.

It will be seen from the above description that a novel combination of a programmable memory device and an electronic sewing machine is provided wherein the operator may select any number of patterns which can be put into the memory and reproduced by the sewing machine. The programmable memory may be used in combination with a read-only memory contained within the machine and having a fixed number of patterns, or can be used separately to program the machine for all patterns. Thus, with the use of the novel combination of the present invention the operator can reproduce substantially an infinite number of patterns limited only by the capability of the sewing instrumentalities of the machine itself. While the invention has been described in this preferred embodiment, it will be obvious to those skilled in the art that various changes and modifications may be made without departing from the spirit and scope thereof as defined in the appended claims.

Having thus set forth the nature of the invention, what is claimed herein is:

1. In a sewing machine having stitch forming means operative to form successive stitches including mechanism for influencing the stitch position coordinates of said successive stitches in the formation of a pattern of stitches, logic means responsive to input data representative of stitch position coordinates for producing stitch position coordinate electrical signals, actuating means responsive to signals from said logic means for controlling the position of said stitch forming means in accordance with the input data fed to said logic means, and re-programmable programming means operably connected with said sewing machine, said programming means being responsive to operator manipulation and including read-write static memory means continuously available for storing new digital input data corresponding to a stitch pattern selected by the operator while connected to said sewing machine and for transmitting electrical digital output signals to said logic means such that an operator may select a stitch pattern program for entry into the sewing machine for automatic reproduction of the stitch pattern by the sewing machine, said programming means further including a plurality of selector buttons with each said button being representative of a digital code corresponding to a stitch position coordinate of a stitch pattern and encoder means for converting the digital code generated by each of said buttons of said programming means actuated by an operator into digital input data suitable for storing in said static memory means.

2. In a sewing machine as recited in claim 1 wherein each said button is representative of a digital code for the bight and feed of a stitch coordinate of a stitch pattern.

3. In a sewing machine as recited in claim 1 wherein said selector buttons are aligned in array such that the operator can visualize a pattern thereon.

4. In a sewing machine as recited in claim 1 wherein each said button is capable of providing a discrete output voltage different from any other of said buttons.

5. In a sewing machine as recited in claim 4 wherein said memory means comprises a static random access memory.

6. In a sewing machine as recited in claim 1 wherein said programming means is disposed remote from said sewing machine and is electrically connected thereto, and is readily detachable from said sewing machine.

7. In a sewing machine as recited in claim 1 wherein said programming means is integral with said sewing machine.

8. A programmable memory unit for a sewing machine having a stitch forming means operative to form successive stitches, including mechanism for influencing the stitch position coordinates of said successive stitches in the formation of a pattern of stitches, logic means responsive to input data representative of stitch position coordinates for producing stitch position coordinate electric signals, actuating means responsive to signals from said logic means for controlling the position of said stitch forming means in accordance with input data fed to said logic means, and means for initiating actuation of successive stitches in the formation of said pattern of stitches, said programmable memory unit comprising:

means responsive to operator manipulation for programming a stitch pattern selected by an operator, said programming means including a plurality of selector buttons with each of said buttons having the capability of generating a digital code corresponding to a stitch position coordinate of a stitch pattern;

read-write static memory means continuously available for storing new digital input data corresponding to stitch position coordinates of a stitch pattern selected by an operator;

encoder means for converting the digital code generated by each of said buttons of said programming means actuated by an operator into digital input data suitable for storing in said static memory means; and, means for coupling said programmable memory unit to said initiating means and said logic means of said sewing machine.

9. A programmable memory unit as claimed in claim 8, wherein said selector buttons of said programming means are aligned and arrayed such that an operator can visualize a pattern thereon.

* * * * *